Dec. 16, 1969  J. F. ZALESKI  3,484,297
RESERVE CELL
Filed Jan. 29, 1968  2 Sheets-Sheet 1

INVENTOR
JOHN F. ZALESKI
BY
ATTORNEY

Dec. 16, 1969  J. F. ZALESKI  3,484,297
RESERVE CELL

Filed Jan. 29, 1968

INVENTOR
JOHN F. ZALESKI
BY Robert Levine
ATTORNEY

United States Patent Office 3,484,297
Patented Dec. 16, 1969

3,484,297
RESERVE CELL
John F. Zaleski, Pleasantville, N.Y., assignor to P. R. Mallory & Co., Inc., Indianapolis, Ind., a corporation of Delaware
Filed Jan. 29, 1968, Ser. No. 701,491
Int. Cl. H01m 7/00, 17/02
U.S. Cl. 136—114                                          6 Claims

ABSTRACT OF THE DISCLOSURE

A primary cell is disclosed in which the electrolyte is maintained separate and distinct from the other components until the cell is ready to be used. The cell incorporates mechanism which allows for the utilization of the electrolyte. The mechanism is separable and detachable from the cell which includes a free floating breaker rod immersed therein to cooperate therewith. The mechanism may be reused as necessary when loaded or primed by a loading tool. The forces required to be overcome in the discharge of the electrolyte are of such nature that the device is tamper-proof and cannot be accidentally activated. The mechanism for overcoming these forces must be confined within extremely narrow quarters and be positive in its results. There is thus obtained a cell having indefinite shelf life, since the electrolyte necessary for the working of the cell is not used until required. The cell therefore is "reserved" for use until the required time. A cell is provided with greater efficiency and more longevity than cells heretofore available.

---

This invention relates generally to deferred chemical reaction devices and make-ready condition devices including means and methods for activating primary cells and reserve cells.

In order to increase the useful longevity of batteries, both for military and civilian use it is desired that battery devices be kept at a ready condition until the operation thereof is required. In this manner, the life cycle of the device is only initiated at the time the operation of the device is required. Such devices have been described as "reserve cells" in that the energy output is withheld or reserved until required. Moreover in such devices it is required that the operation of the device be positive and be fool-proof. Accordingly, the forces and mechanism required to activate such devices must be such that untoward and accidental firing of the devices be precluded. However, concomitantly the activating or firing of the devices must be exceedingly rapid and positive and the construction of the firing apparatus in association with its cell be as simple as possible.

The invention has particular applicability to an alkaline manganese structure, utilizing its new concept in anode design which will exhibit high efficiency over a wide temperature range. Momentary high current pulses in the range of 12 to 15 amperes are possible.

The cell is manufactured in a dry state, the electrolyte being contained in a plastic vial within the cell. When stored in this manner, shelf life capabilities of 10 years or more can be attained. To activate the cell, the activating mechanism is rotated in either direction as hereinafter described. This releases a spring loaded plunger which breaks the electrolyte vial. Continued rotation permits the activating mechanism to be removed and discarded, resulting in a standard "D" size cell. A "safety" pin is incorporated to prevent accidental activation during handling and transit. The force generated in the activator is in the order of 25 lbs./sq. inch in a travel of approximately 3/16".

Activation time is approximately 2 seconds when the cell is not under load. When under a 4 ohm. load, the activation time, to a 1.35 volt level, is less than 5 seconds at 70° F., and less than 30 seconds at 30° F. The cell is thus considerably more efficient and usable than other such cells.

The cell has been constructed so that it is not position sensitive either during the activation or discharge period, and after activation, can be handled and used as a standard alkaline cell. Shelf life, after activation, is the same as a standard alkaline manganese cell, 2 years under casual storage conditions.

It is therefore an object of the present invention to provide a primary cell which may be shelf stored for given periods of time without deterioration.

It is still another object of the present invention to provide a reserve type of primary cell having an output deliverable only when desired and capable of indefinite storage without energy loss.

Another object of the present invention is to provide mechanism in a "reserve" type primary cell for activating said cell, said mechanism being fail-safe and positive in action.

Another object of the present invention is to provide in an unitary combination, a primary cell and an electrolyte activator for electrolyte stored in said primary cell, said activator being capable of generating a considerable driving force capable of piercing the storage reservoir of the electrolyte as included in said primary cell.

Another object of the present invention is to provide a primary cell including a plurality of concentrically fittable chambers, one of said chambers being sealed and containing the electrolyte for said cell, said sealed chamber being rupturable by means coupled to an externally attached separable member and said coupled member being free floating and immersed within said sealed chamber extending the entire length of said chamber.

Generally speaking the present invention is directed toward providing a primary cell in which the electrolyte is separably contained and withheld from affecting the operation of the cell until such time as the device is needed.

The cell will, accordingly, remain in potential and standby use until the electrolyte is allowed to activate the battery. The electrolyte is included in a sealed chamber which must be ruptured in order to function. The cell, thus comprises a plurality of concentrically interfittable chambers, one of the chambers is sealed and includes the electrolyte. Rupturing means is immersed within the chambers in a manner such that both end walls of the electrolyte chambers are ruptured in order to allow inimpeded flow of the electrolyte.

An outside priming device is fixedly but separably coupled to the immersed rupturing means so that the seal of the chamber remains intact until the priming device is activated. The cell thereof always remains sealed even during rupture. The activating device is capable of exerting a rupturing force sufficient to break both end walls of the electrolyte chamber and is concomitantly disposable and separable from the battery, per se, upon its firing.

Figure 1:
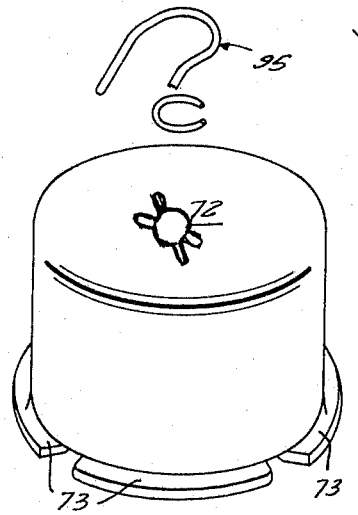
FIGURE 1 is a cross-sectional view of the reserve cell of the present invention wherein the electrolyte reservoir is shown as being concentrically maintained therewithin.
Figure 1:
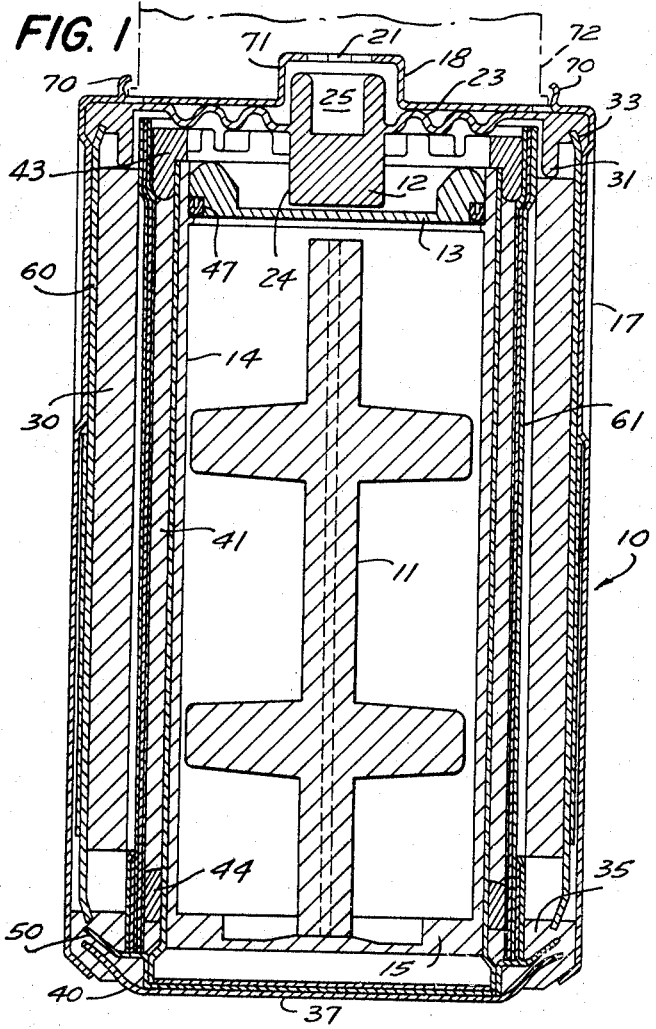

Now referring to the figures of the drawing: FIGURE 1 is a cross-sectional vertical view of the "reserve" type cell 10 of the invention wherein an immersed breaker rod 11 is coaxially aligned with an external plunger 12. Separating the rod and the plunger is an end wall 13 of the electrolyte reservoir 14 of the cell. The wall seals the reservoir hermetically against leakage until it is predeterminedly ruptured. As seen, the opposing bottom wall 15 of the reservoir is integrally formed therewith to completely seal and encapsulate the liquid electrolyte but which will also be ruptured by the impact of the immersed descending rod.

The cell comprises an outer can 17 with a center stepped structure or platform 18 to which is coupled the external activator 20 as hereinafter described. The platform has a guidance slot 21 made therein which will act to direct the plunger pin or impactor 22 contained in the activator 20. Directly beneath and adjacent the top end of the outer can is an unitarily formed polyethylene corrugated diaphragm 23 and centrally formed piston-grommet assembly 24. The piston thereof has a slotted head 25 to accommodate the plunger of the activator and rests at a point above and coaxial with the immersed rod in the electrolyte reservoir. The corrugations of the diaphragm give resilience to the plunger as well as providing a seal for the cell when the adjacent reservoir wall is ruptured.

In the construction of the cell, the diaphragm has the portions adjacent the side walls of the outer can situated on top of the depolarizer element 30 of the cell. It is placed atop said element by dependencies 31 unitarily formed therewith to form a sealing seat. The end portions also include means for holding a depolarizer contact can 33. On the opposite side of the cell, a second sealing seat 35 is also provided. This second sealing seat retains a double closure end means 37 so as to seal off the bottom of the cell 40. It is seen that the bottom of the electrolyte reservoir has integrally formed steps making raised contact with the double closure end means.

The anode material 41 of the cell, which may be powder, is held between top and bottom retaining units 43, 44 fabricated of plastic. The configuration of the top unit is such that the protuberances of the electrolyte reservoir chamber allows the center portion to be lower than the outer extremity. A portion of this extremity is grooved to contain a grommet 47 therein. The reservoir 14 used herein is the subject of copending application Ser. No. 722,703, filed Apr. 19, 1968.

Again, the anode material is supported at its bottom by means of a lower retaining unit. The unit abuts and sits on the sinuated inside portion 50 of the double end assembly of the cell and makes electrical contact therewith by means of an anode can. Between the depolarizer of the cell and the outside can is a cathode can 60. On the opposite side of the depolarizer there is located an absorbent barrier 61. For venting purposes there is provided a vent means in the outer can structure of the cell. The structure as shown has an anode assembly capable of retaining powdered anode material.

As stated previously, an activator 20 is coupled to the cell in a manner such as to energize the cell by providing a keyway 21 in the cell through which a plunger 22 of the activator may penetrate.

Figure 3:
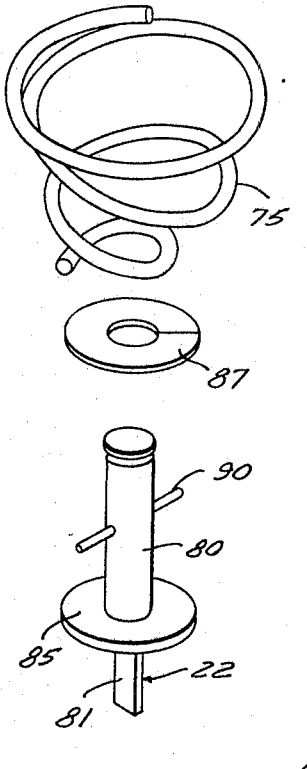
FIGURE 3 is an exploded view of a cap triggering device utilized to penetrate the electrolyte reservoir of the reserve cell and which is mounted and directly coupled to the closure end of the cell.

The construction and coupling arrangement for the activator is shown in FIGURE 3 of the drawing.

Figure 2:
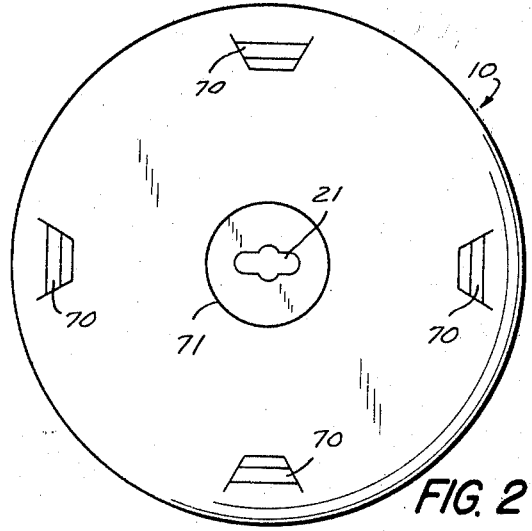
FIGURE 2 is a top view of the reserve cell showing an end closure therefor, said end closure adapted to receive a top cap construction mounted and coupled thereto for allowing means to penetrate therethrough so as to enter the electrolyte reservoir of the reserve cell.
Figure 4:
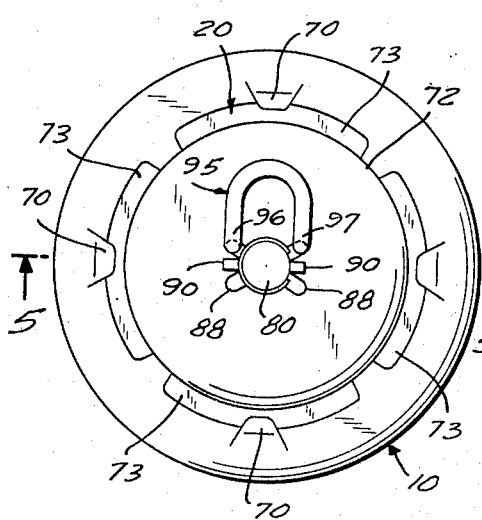
FIGURE 4 is a top view of the cap construction cocked.
Figure 6:
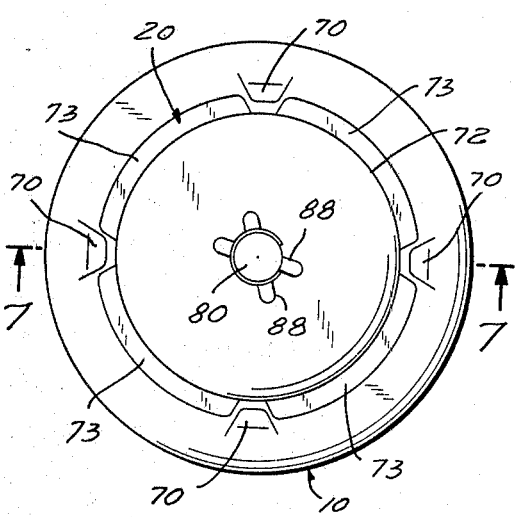
FIGURE 6 is a top view of the cap construction uncocked.
Figure 5:
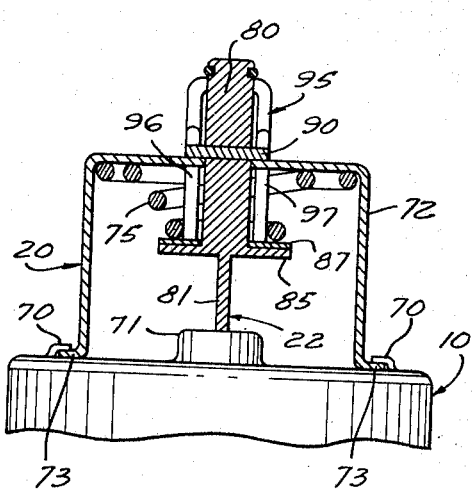
FIGURE 5 is a cross sectional view taken along line 5—5 of FIGURE 4 of the cap construction as cocked and mounted upon the end closure of the reserve cell to form an essentially hermetically sealed device.
Figure 7:
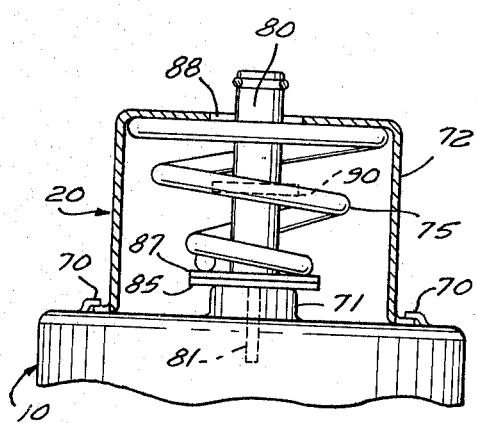
FIGURE 7 is a cross-sectional view taken along line 7—7 of FIGURE 6 of the triggering device in the uncocked state and which allows for the separation of the cap from the end closure of the reserve cell.

As shown in FIGURE 2, one end of the outer can acts as a closure for the cell and has its surface formed as a top cap construction for coupling the activating device thereto. The top surface has a multiplicity of spaced ears 70 struck out therefrom. At the center of the surface is a keyed or slotted platform 71 integrally formed thereof. An activator assembly is coupled to the cell and is separable therefrom. The assembly 20 is of a cupola shaped configuration 72 having a multiplicity of lips 73 integrally and horizontally formed at an end thereof. These lips are adapted to interfit with the struck out ears of the top cell wall so as to be retained thereby and to be moved therewithin along for the extent of the lips. Since each lip is separated from each other, turning the assembly a predetermined amount will allow the assembly to be separated from the cell. As shown in FIGURE 3, the plunger included within the assembly is spring 75 loaded. The assembly can be cocked by maintaining the spring under compression. As shown in FIGURES 4 and 5, the plunger comprises a top portion 80 and a lower portion 81 divided by an annular seat 85 against which the spring may be loaded. The spring bears against the seat upon which a washer 87 is placed. The cap has criss-crossed slots 88 formed at the top. (FIGURE 4).

Extending horizontally from the top of the activator plunger are two side bars 90 which can pass through the slots of the cap but which when turned to the land portions between the slots together with the use of a retaining ring will help maintain the compressed spring under sufficient restraint to cause the spring loading of the plunger. This force maintained under compression when allowed to escape has tremendous power within a short travel distance and acts as a ram so as to break both ends of the electrolyte container through impacting the coaxially immersed reservoir rod.

Again, the cocked and uncocked conditions of the spring activator assembly are shown in FIGURES 4 and 5. In order to assume that the activator will only fire when desired a fail-safe mechanism 95 having the configuration of a horseshoe shape clip is provided. The tines 96, 97 of the clip are placed within the slots at the top of the activator assembly so that rotation is prevented and the plunger bars will not be allowed to pass through the slots of the cap.

In the operation of the reserve cell, as soon as the plunger is released, the electrolyte reservoir is ruptured by having both end walls impacted. At the same time the activating assembly is separated from the cell by the force generated by the uncocked spring. The electrolyte will then flow so as to create the necessary chemical reaction to generate battery power. Thus, it is seen that until such a reaction takes place and the electrolyte used, the cell will be capable of being stored indefinitely.

A preferred embodiment of the invention is here disclosed and the scope of the invention will be determined by the claims as here afforded.

What is claimed is:

1. A reserve cell comprising a cathode external can, a depolarizer adjacent thereto, an absorbent member placed against said depolarizer, an anode structure for said cell placed against said absorbent member separated from said depolarizer, on electrolyte reservoir having top and bottom closed ends for containing electrolyte solely therewithin, said reservoir being disposed adjacent said anode and within said outer can, a free floating rupturing rod immersed within said reservoir and extending substantially the entire length thereof, activating means within said cell situated outside a closed end wall of said reservoir, said activating means separate from and capable of impacting said immersed rod for rupturing both end walls of said reservoir thereby causing a flow of the electrolyte to activate said cell, and closure means integrally joined to said activating means to maintain a hermetic seal within said cell when said reservoir walls are ruptured and said electrolyte is caused to flow therein.

2. A reserve cell comprising a cathode external can, a depolarizer adjacent thereto, an absorbent member placed against said depolarizer, an anode structure for said cell placed against said absorbent member separated from said depolarizer, a frangible electrolyte reservoir having top and bottom closed ends for containing electrolyte solely therewithin, said reservoir being disposed adjacent said anode and within said outer can, a free floating rupturing rod having a plurality of angulated arms immersed within said reservoir and extending substantially the entire length thereof, said arms extending outward therefrom toward the side walls of said reservoir, activating means within said cell situated outside a closed end wall of said reservoir, said activating means separate from and capable of impacting said immersed rod for rupturing both end walls of said reservoir thereby causing a flow of the electrolyte to activate said cell, and closure means integrally joined to said activating means to maintain a hermetic seal within said cell when said reservoir walls are ruptured and said electrolyte is caused to flow therein.

3. A reserve cell comprising a cathode external can, a depolarizer adjacent thereto, an absorbent member placed against said depolarizer, an anode structure for said cell placed against said absorbent member separated from said depolarizer, a plastic electrolyte reservoir having top and bottom closed ends for containing electrolyte solely therewithin, said reservoir being disposed adjacent said anode and within said outer can, a free floating rupturing rod immersed within said reservoir and extending substantially the entire length thereof, activating means within said cell situated outside a closed end wall of said reservoir, said activating means separate from and capable of impacting said immersed rod for rupturing both end walls of said reservoir thereby causing a flow of the electrolyte to activate said cell and resilient closure means integrally joined to said activating means to maintain a hermetic seal within said cell when said reservoir walls are ruptured and said electrolyte is caused to flow therein.

4. A reserve cell comprising a cathode external can, a depolarizer adjacent thereto, an absorbent member placed against said depolarizer, an anode structure for said cell placed against said absorbent member separated from said depolarizer, a plastic electrolyte reservoir having top and bottom closed ends for containing electrolyte solely therewithin, said reservoir being disposed adjacent said anode and within said outer can, a free floating rupturing rod immersed within said reservoir and extending substantially the entire length thereof, activating means within said cell situated outside a closed end wall of said reservoir, a separate firing device coupled thereto, said activating means separate from and capable of impacting said immersed rod for rupturing both end walls of said thereby causing a flow of the electrolyte to activate said cell and closure means integrally joined to said activating means to maintain a hermetic seal within said cell when reservoir upon release of energy from the firing device said reservoir walls are ruptured and said electrolyte is caused to flow therein.

5. A reserve cell comprising a cathode external can, a depolarizer adjacent thereto, an absorbent member placed against said depolarizer, an anode structure for said cell placed against said absorbent member separated from said depolarizer, a electrolyte reservoir having top and bottom closed ends for containing electrolyte solely therewithin, said reservoir being disposed adjacent said anode and within said outer can, a free floating rupturing rod immersed within said reservoir and extending substantially the entire length thereof, a keyed slot activating means for vertically descending within said cell situated outside a closed end wall of said reservoir, a plunger separably connected to said activating means which is also separate from an capable of impacting said immersed rod for rupturing both end walls of said reservoir thereby causing a flow of the electrolyte to activate said cell and closure means integrally joined to said activating means to maintain a hermetic seal within said cell when said reservoir walls are ruptured and said electrolyte is caused to flow therein.

6. A reserve cell comprising a cathode external can, a depolarizer adjacent thereto, an absorbent member placed against said depolarizer, an anode structure for said cell placed against said absorbent member separated from said depolarizer, an electrolyte reservoir having top and bottom closed ends for containing electrolyte solely therewithin, said reservoir being disposed adjacent said anode and within said outer can, a free floating rupturing means immersed within said reservoir, activating means within said cell situated outside a closed end wall of said reservoir, said activating means separate from and capable of impacting said immersed rupturing means for rupturing both end walls of said reservoir thereby causing a flow of the electrolyte to activate said cell, and closure means integrally joined to said activating means to maintain a hermetic seal within said cell when said reservoir walls are ruptured and said electrolyte is caused to flow therein.

References Cited

UNITED STATES PATENTS

| | | | |
|---|---|---|---|
| 2,787,650 | 4/1957 | Blaru | 136—90 |
| 2,918,515 | 12/1959 | Lawson | 136—114 XR |
| 2,948,767 | 8/1960 | Johnson et al. | 136—90 |
| 3,005,863 | 10/1961 | Floyd et al. | 136—90 |
| 3,232,697 | 2/1966 | Amiet et al. | 136—162 |
| 3,266,942 | 8/1966 | Lear | 136—114 XR |

FOREIGN PATENTS

| | | |
|---|---|---|
| 1,061,544 | 3/1967 | Great Britain. |

WINSTON A. DOUGLAS, Primary Examiner

A. SKAPARS, Assistant Examiner

U.S. Cl. X.R.

136—90